United States Patent
Horst et al.

(10) Patent No.: US 8,348,209 B2
(45) Date of Patent: Jan. 8, 2013

(54) UNIVERSAL RETAINING DEVICE, PARTICULARLY FOR FASTENING PANEL ELEMENTS AND/OR ACCESSORY PARTS IN AIRCRAFT

(75) Inventors: Markus Horst, Bad Oldesloe (DE); Stephan Röpke, Buxtehude (DE)

(73) Assignee: Airbus Operations GmbH (DE)

( * ) Notice: Subject to any disclaimer, the term of this patent is extended or adjusted under 35 U.S.C. 154(b) by 589 days.

(21) Appl. No.: 11/988,147

(22) PCT Filed: Jul. 3, 2006

(86) PCT No.: PCT/EP2006/006470
§ 371 (c)(1),
(2), (4) Date: Jun. 16, 2009

(87) PCT Pub. No.: WO2007/003403
PCT Pub. Date: Jan. 11, 2007

(65) Prior Publication Data
US 2009/0261202 A1 Oct. 22, 2009

(30) Foreign Application Priority Data
Jul. 2, 2005 (DE) .......................... 10 2005 030 997

(51) Int. Cl.
*A47B 96/06* (2006.01)
(52) U.S. Cl. .................. 248/222.11; 248/317; 248/323; 403/329; 244/131
(58) Field of Classification Search .................... 40/553, 40/606.01, 617; 244/131; 248/222.11, 317; 248/323; 403/329
See application file for complete search history.

(56) References Cited

U.S. PATENT DOCUMENTS

| | | | |
|---|---|---|---|
| 4,050,208 A | 9/1977 | Pompei et al. | |
| 4,858,878 A * | 8/1989 | Gassaway | 248/551 |
| 5,131,620 A * | 7/1992 | Boundy | 248/674 |
| 5,337,583 A * | 8/1994 | Giles et al. | 60/752 |
| 5,409,191 A * | 4/1995 | Wenmaekers | 248/317 |
| 5,950,340 A * | 9/1999 | Woo | 40/564 |
| 6,457,270 B1 * | 10/2002 | Stark et al. | 40/570 |
| 6,641,325 B2 * | 11/2003 | Schwarz | 403/329 |
| 2003/0218111 A1 | 11/2003 | Labeirie et al. | |
| 2005/0082431 A1 | 4/2005 | Scown et al. | |
| 2005/0254889 A1* | 11/2005 | Roepke et al. | 403/329 |
| 2006/0088376 A1* | 4/2006 | Tjon et al. | 403/321 |

FOREIGN PATENT DOCUMENTS

| | | |
|---|---|---|
| DE | 20016889 U | 12/2000 |
| DE | 10227237 | 1/2004 |
| EP | 1104853 A1 * | 6/2001 |
| EP | 1593859 | 11/2005 |
| EP | 1612138 | 1/2006 |
| WO | 2006029846 | 3/2006 |

OTHER PUBLICATIONS
International Search Report, PCT/EP2006/006470.

* cited by examiner

*Primary Examiner* — Terrell McKinnon
*Assistant Examiner* — Daniel J Breslin
(74) *Attorney, Agent, or Firm* — Lerner, David, Littenberg, Krumholz & Mentlik, LLP

(57) ABSTRACT

A universal bracket for fastening different panel elements and/or additional devices in aircraft, comprises a base plate for fastening to a substructure, a support plate connected to the base plate and a plurality of spring clips received in the support plate to provide a releasable and vibration-damping connection to the panel elements. The base plate has at least one bore screen for fastening at least one device carrier for fastening at least one additional device, in particular emergency lighting, an emergency exit sign or the like, in different positions, wherein the fastening of the device carriers is provided with a fastening device such as fastening rivets, screws or the like.

12 Claims, 3 Drawing Sheets

UNIVERSAL RETAINING DEVICE, PARTICULARLY FOR FASTENING PANEL ELEMENTS AND/OR ACCESSORY PARTS IN AIRCRAFT

The invention relates to a universal bracket, in particular for fastening panel elements and/or additional installations in aircraft, with
- a base plate for fastening to a substructure,
- a support plate connected to the base plate, and
- a plurality of spring clips housed in the support plate for making a releasable and vibration-damping connection with the panel elements.

A multiplicity of fastening elements, which are used among other things for fastening panel sheets to a substructure of fuselage cells or the like are known in aircraft and vehicle manufacture, particularly in passenger aircraft manufacture, for the completion of the interior. In this case it is necessary for the panel sheets are easily connected to the substructure in a releasable and at the same time vibration-damping manner. Vibration-damping fastening is intended, in particular, to prevent the generation of rattling noises. It is also often necessary to integrate with the ceiling panels additional installations, for example emergency lighting or emergency exit signs. In addition, the fastening elements should also allow compensation for tolerances-between the panel sheets and the substructure, for example to ensure the smallest and most uniform gap dimension possible between the panel sheets.

However, the prior art embodiments of such fastening elements are not sufficiently flexible in terms of their adaptability to different installation requirements, and cannot for example be installed in different aircraft types with different distances between annular frame without expensive adaptation work.

DE 200 16 889 U1 discloses a retaining device with four spring clips for fixing four corner regions of panel sheets abutting each other to a supporting substructure of a fuselage cell of an aircraft, a base plate being adjustably formed in the x-direction and a retaining plate being adjustably formed in the y-direction in order to provide the possibility of equalising tolerances between the panel sheets. The two-dimensional displaceability is achieved by two slots in both the base plate and the retaining plate. This ensures, among other things, uniform gap dimensions between the panel sheets independently of any production tolerances. An additional attachment of optional accessories is not possible by means of the prior art retaining element.

EP 1 612 138 A1 relates to a retaining device for a light strip cover in an inner panel of a fuselage cell of an aircraft. A first member of a retaining clip is fixedly connected to the supporting substructure of the fuselage cell. A second member with an end face fork-shaped opening is pivotably articulated in the rear region of the retaining clip. A retaining shoe, which can be slid onto the second member, is secured to the inside of the light strip cover. In a conceived extension of the retaining shoe a locking pin is also fastened to the light strip cover. When the retaining shoe has been slid fully over the second member, the second member is swivelled upwards and the locking pin can be engaged with an end-face section of the first member for fixing the light strip cover. A possibility of equalising tolerances is not provided with the retaining element according to EP 1 612 138 A1.

The object of the invention is to provide a fastening element which can be used universally for the fastening of panel elements, in particular inner panel sheets for substructures of fuselage cells of different aircraft types, and which also allows a flexible attachment of additional, optional installations or additional modules, for example emergency lighting, emergency exit signs or the like.

Because the base plate has at least one bore screen for fastening at least one device carrier for fastening at least one additional installation, in particular an emergency lighting, an emergency exit sign or the like, in different positions, the device carrier or carriers being fastened with fastening means, in particular fastening rivets, screws or the like, universal adaptability and usability of the universal bracket according to the invention to/on supporting structures of fuselage cells of different aircraft types is possible. The optional device carrier or carriers allow, if necessary, the fastening of additional installations, for example in the form of emergency lighting, an emergency exit sign or the like.

An advantageous embodiment of the universal bracket according to the invention provides for the bore screen or the bore screens being arranged essentially parallel with a base side of the support plate and comprising a multiplicity of bores arranged at approximately the same distance from each other, in particular a distance of approximately 1.27 cm from each other.

The bore screen, designed in the form of a multiplicity of bores inserted preferably at a uniform distance from each other in the support plate, allows flexible adaptation of the spatial position of one or a plurality of device carriers to the prevailing local installation conditions during assembly, particularly in the case of different aircraft types and derivatives of the same aircraft type. Consequently the universal bracket can be used extremely flexibly for a multiplicity of different installation situations. Because of the inventively provided flexibility of the universal bracket according to the invention, the number of parts to be stocked can be reduced. Moreover, the development cost of the otherwise necessary construction of a multiplicity of supports specially adapted to the different applications is also reduced.

A further advantageous embodiment of the universal bracket provides for the support plate to be connected displaceably to the base plate to enable an equalisation of tolerances.

This enables any production tolerances of the substructure or the fastening bores inserted in it to be equalised in a simple manner even during assembly of the universal bracket.

According to a further advantageous embodiment of the universal bracket provision is made for a support frame with at least one spring clip is arranged on the support plate to fasten further panel elements, in particular cover plates or the like.

Any joints or other intervening spaces existing between the panel sheets can be covered by means of a cover plate in an optically advantageous manner.

According to a further advantageous embodiment of the universal bracket the base plate is formed with a fibre reinforced plastic material.

This embodiment guarantees simple, low cost production of the base plate, which has a complex surface geometry with a multiplicity of recesses, bores, elevations and indentations. Moreover, the use of a fibre reinforced plastic material permits a weight reduction.

According to a further advantageous embodiment of the universal bracket at least two spring clips are displaceably received on the support plate in a spatial direction to enable the tolerances to be equalised.

This provides a further possibility of equalising tolerances in a direction transverse to the possibility of equalising tolerances between the base plate and the support plate of the universal bracket.

Further advantageous embodiments of the device are explained in the further claims. The same structural elements are denoted by the same reference number in the drawing.

In the drawing

Figure 1:
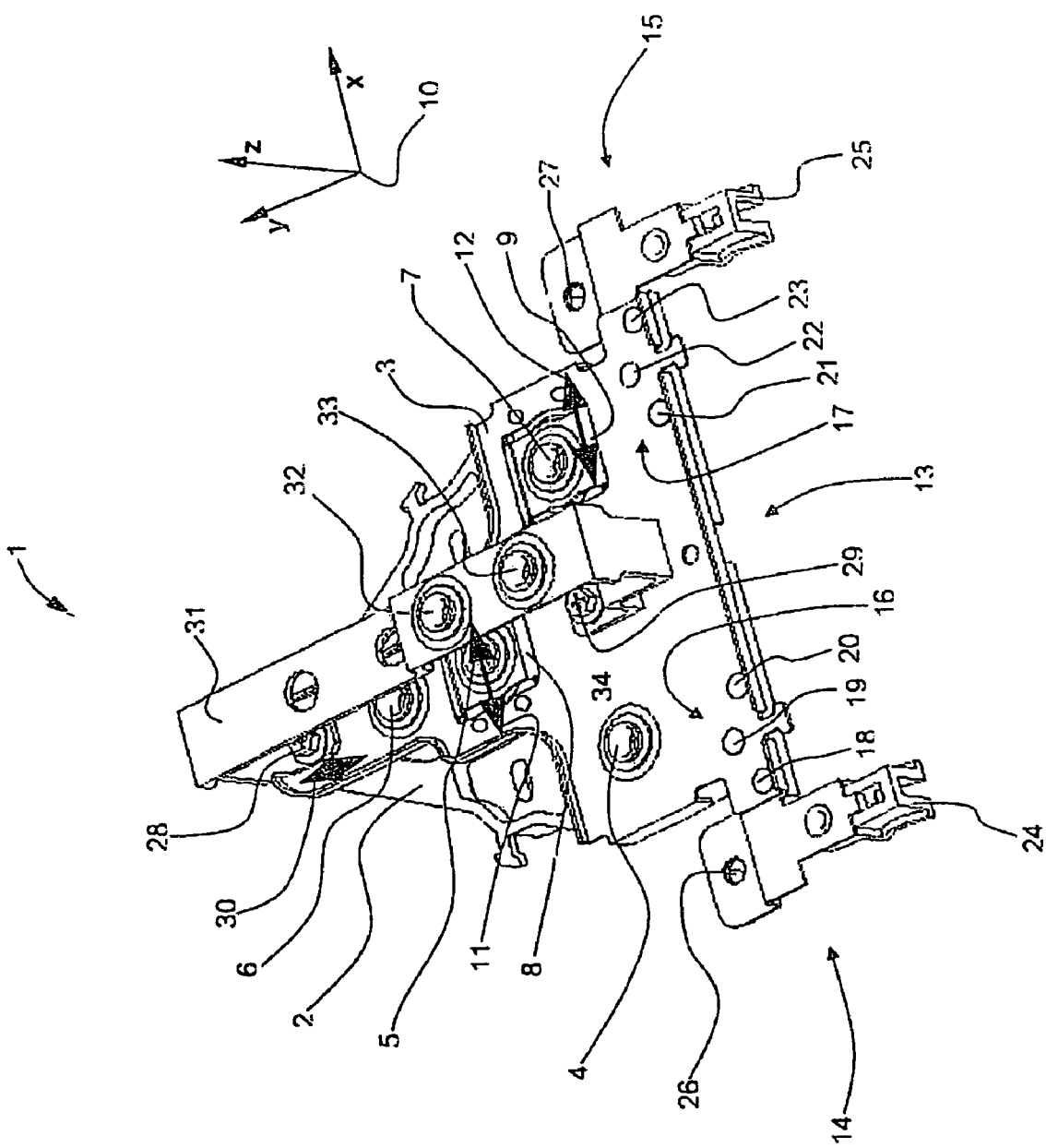
FIG. 1 shows a perspective view of a universal bracket according to the invention with two device carriers from below (assembly side of the panel elements).
Figure 2:
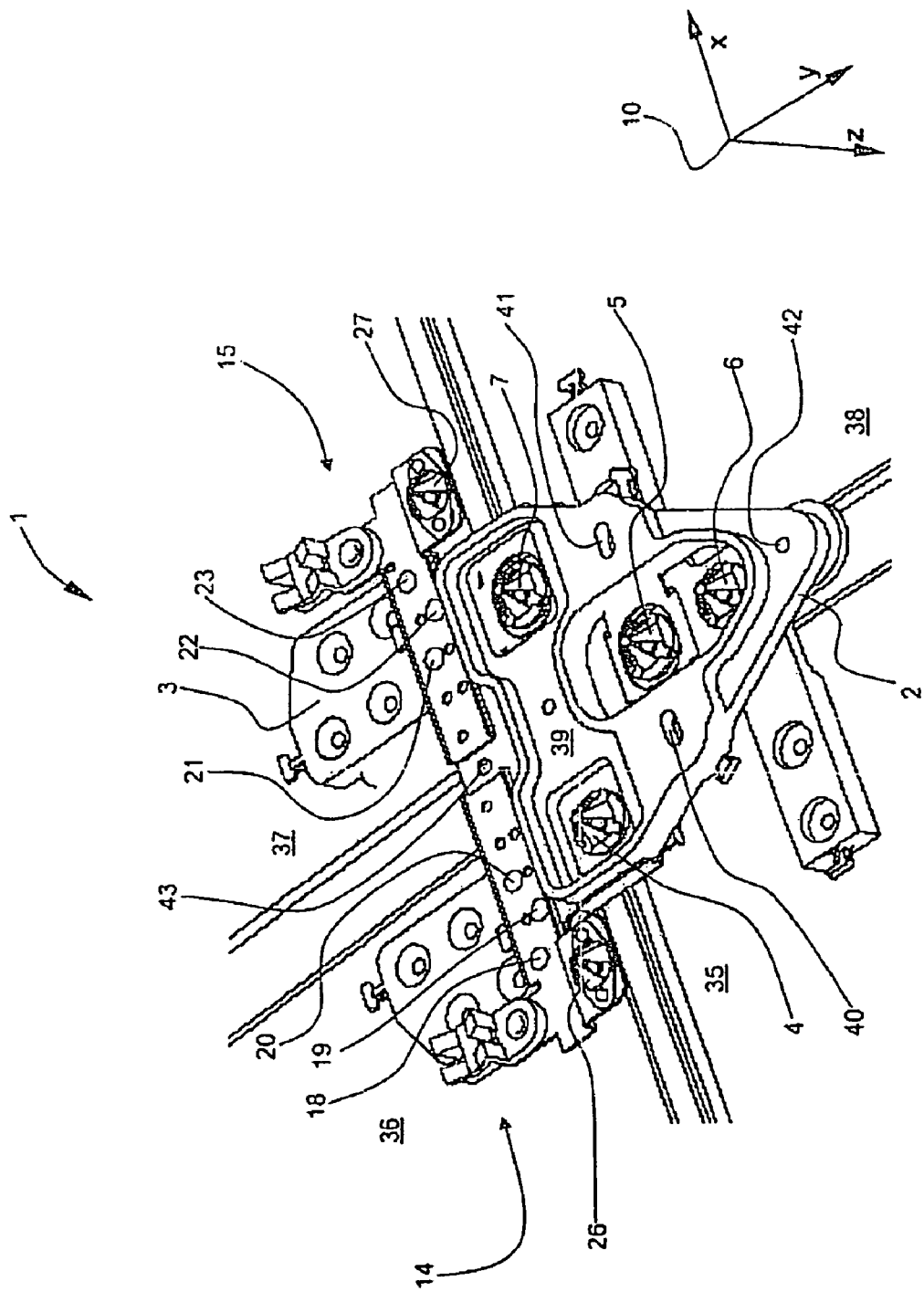
FIG. 2 shows a perspective view of the universal bracket with two device carriers from above.
Figure 3:
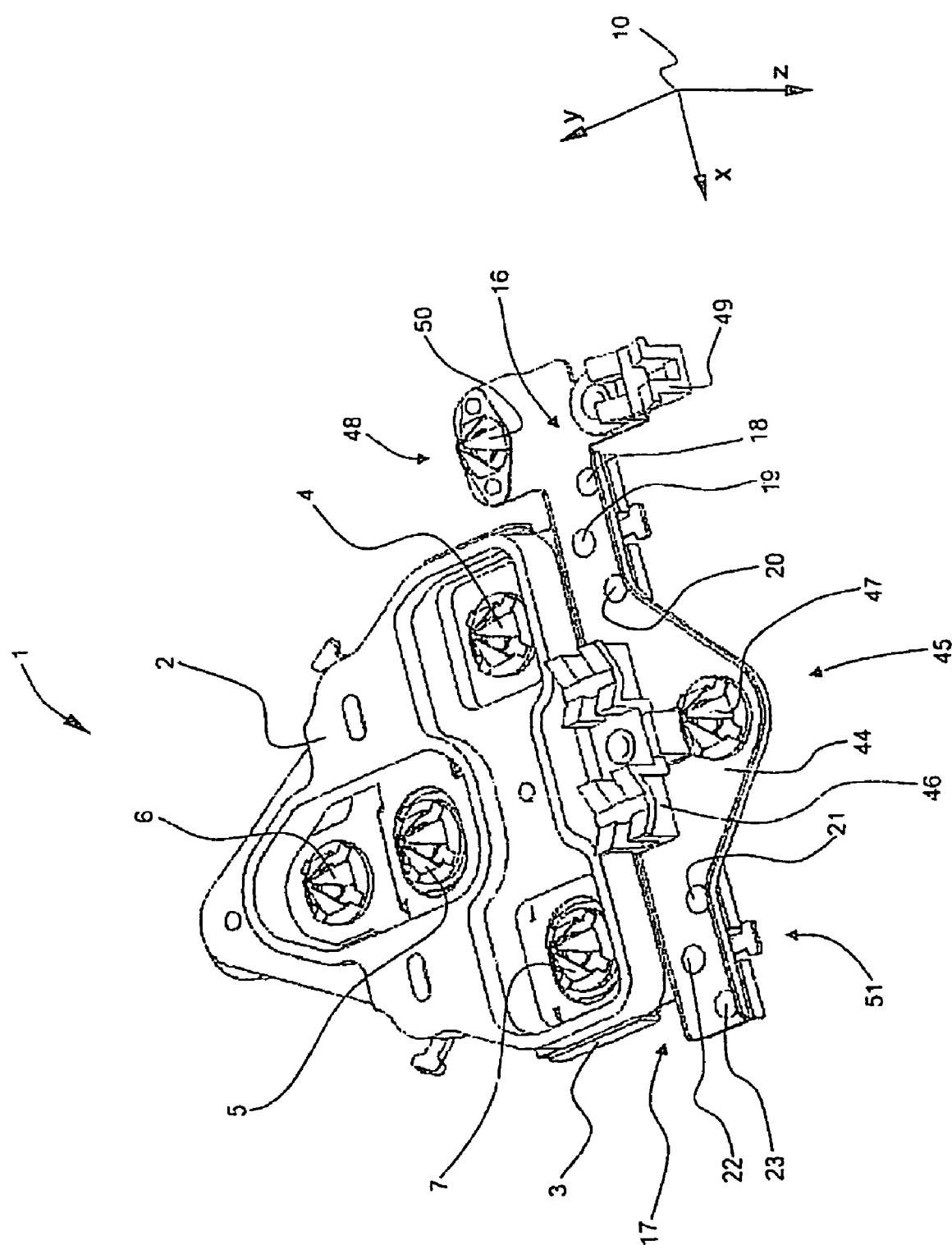
FIG. 3 shows a perspective view of the universal bracket from above with one continuous device carrier.

For a more detailed description of the invention reference is made to FIGS. 1 to 3. FIG. 1 shows a perspective view of the universal bracket according to the invention with two device carriers.

Universal bracket 1 comprises, among other things, a base plate 2 connected to a support plate 3. Base plate 2 is used to connect universal bracket 1 to a supporting structure, not shown, for example annular frames, longitudinal support members or the like, of a fuselage cell. In the exemplary embodiment shown in FIG. 1, spring clips 4 to 7 are arranged in base plate 2. Spring clips 4 to 7 are used, for example, to fasten panel sheets or panel elements not shown in FIG. 1, locking pins fastened to the panel sheets being capable of being inserted releasably in spring clips 4 to 7 and of engaging in them.

Spring clips 4 to 7 each have four spring arms which are arranged to correspond to the lateral surfaces of a square pyramid. The locking pins can be inserted from below in spring clips 4 to 7. Here the spring arms spread out and engage in a circumferential recess on the end of the locking pin, so that there is a connection that can be mechanically loaded, but nevertheless released again, if necessary, between the locking pin and spring clip.

Spring clips 4 and 6 are fastened in bores in base plate 2 by means of rubber buffers and locking rings, not shown in detail. On the other hand, spring clips 5 and 7 are arranged on a slide 8, 9, which are in turn displaceably received inside base plate 2 parallel to the x-axis of a coordinate system 10 in the direction of double arrows 11, 12. Slides 8, 9 have bores, not shown in detail, in which spring clips 5 and 7 are also fastened by means of a rubber buffer and a locking ring. The displaceability of spring clips 5, 7 is used to equalise the tolerances of the panel sheets relatively to each other and in relation to universal bracket 1.

Two device carriers 14, 15 are arranged in the region of a base side 13 of support plate 3 having an essentially triangular design. Device carriers 14, 15 are used, for example, to receive emergency lighting or an emergency exit sign or the like, not shown. Bore screens 16, 17 are inserted in the region of base side 13 of support plate 3, on both sides, for fastening device carriers 14, 15. In the exemplary embodiment shown, bore screens 16, 17 each have three through bores which, for better clarity in the drawing, are not provided with a reference number. Bore screens 16, 17 may also be designed as a continuous bore screen passing into each other. Device carriers 14, 15 have correspondingly designed bores so that device carriers 14, 15 can be connected, for example, by riveted, screwed, locked or clamped connections to support plate 3. In the exemplary embodiment shown in FIG. 1, device carriers 14, 15 are connected to base plate 2 with fastening rivets 18 to 23. Here the bores are inserted in base plate 3 at an essentially uniform short distance from each other parallel to base side 13. In a particularly preferred embodiment of universal bracket 1 the bores are approximately 1.27 cm (½ inch) from each other parallel to the x-axis. This enables device carriers 14, 15 to be positioned parallel to the x-axis in a screened manner in steps of 1.27 cm, and to be fixed by means of the fastening rivets so that the position of device carriers 14, 15 can be adapted to different installation requirements in the fuselage cell and substructure of the fuselage cell during assembly. Other screen dimensions for the arrangement of the holes are also possible for bore screens 16, 17.

Furthermore, cable holders 24, 25 are arranged at the ends of device carriers 14, 15. In addition, device carriers 14, 15 have spring clips 26, 27 which serve to fasten additional installations, for example in the form of emergency lighting and/or an emergency exit sign.

Base plate 2, which serves to connect universal bracket 1 to the structure of the aircraft or its fuselage cell substructure, is connected to support plate 3 by two connecting elements, in particular by means of screws 28, 29. Base plate 2 is in this case displaceable in the direction of black double arrow 30 in relation to support plate 3 parallel to the y-axis to provide tolerance equalisation. For this purpose two slots concealed by support plate 3 are inserted in base plate 2, through which slots are guided screws 28, 29 to connect base plate 2 to support plate 3.

Furthermore, a strap-type support frame 31 is arranged above support plate 3. Here support frame 31 is also connected by means of screws 28, 29 to support plate 3 or base plate 2 respectively. In support frame 31 are arranged two further spring clips 32, 33, which are used, in particular, for the lockable fastening of cover plates or the like, not shown. Spring clips 32, 33 are in turn received by means of rubber buffers and locking rings in support frame 31 in a vibration-damping manner, corresponding to the other spring clips. Support frame 31 runs approximately parallelly spaced to one underside 34 of support plate 3, parallel to the y-axis. Underside 34 in this case faces the inner faces of the panel sheets and panel elements to be fitted on universal bracket 1. The cover plates, which can be fastened by means of support frame 31, for example, serve in particular for covering intervening spaces or joints between the panel sheets.

FIG. 2 shows universal bracket 1 in a view rotated approximately 180° about the x-axis of coordinate system 10 in relation to the representation shown in FIG. 1, i.e. from above.

Four panel sheets 35 to 38, which, in the representation in FIG. 2, are locked from "below", i.e. against the direction of the z-axis, with spring clips 4 to 7 and 26, 27, are fastened to universal bracket 1. Device carriers 14, 15 are connected to support plate 3 by means of fastening rivets 18 to 23. An upper side 39 of base plate 2 faces the substructure or supporting structure of the fuselage cell, not shown in the representation in FIG. 2, and is fastened to it, for example by means of a screwed connection, through slots 40, 41 to enable tolerances to be equalised parallel to the x-axis. Screws 28, 29 are inserted in threaded bores 42, 43 for connecting base plate 2 to support plate 3.

FIG. 3 shows universal bracket 1 in an embodiment variant with an alternatively designed device carrier in a perspective view rotated approximately 180° about the z-axis compared to the representation in FIG. 2, i.e. from above.

The position of universal bracket 1 in space is illustrated by coordinate system 10. The structural design of universal bracket 1 with base plate 2, support plate 3 and spring clips 4 to 7 arranged therein, corresponds essentially to the structure of universal bracket 1 already explained within the framework of the description of FIGS. 1, 2.

Base plate 2 is connected to support plate 3. A device carrier 44, designed in one piece, is arranged on support plate 3, in contrast to the design of universal bracket 1 shown in FIGS. 1, 2. Device carrier 44 is connected to support plate 3 by fastening rivets 18 to 23 arranged in bore screen 16, 17. A cable holder 46 and a spring clip 47 are fastened to device carrier 44 in a central region 45. A further cable holder 49 and a further spring clip 50 are arranged in a right-side edge region 48 of device carrier 44. Left edge region 51 of device carrier 44 is free in the embodiment variant shown, however, if necessary, it may also receive a spring clip and/or a cable holder.

Device carrier 14, 15 and the design variant of device carrier 44 represent, by way of example, some of the possible structural designs of device carriers to which any additional installations, for example emergency lighting, an emergency exit sign or the like, can be fastened and positioned.

LIST OF REFERENCE NUMBERS

1 Universal bracket
2 Base plate
3 Support plate
4 Spring clip
5 Spring clip
6 Spring clip
7 Spring clip
8 Slide
9 Slide
10 Coordinate system
11 Double arrow
12 Double arrow
13 Base side
14 Device carrier
15 Device carrier
16 Bore screen
17 Bore screen
18 Fastening rivet
19 Fastening rivet
20 Fastening rivet
21 Fastening rivet
22 Fastening rivet
23 Fastening rivet
24 Cable holder
25 Cable holder
26 Spring clip
27 Spring clip
28 Screw
29 Screw
30 Double arrow
31 Support frame
32 Spring clip
33 Spring clip
34 Underside (support plate)
35 Panel sheet
36 Panel sheet
37 Panel sheet
38 Panel sheet
39 Upper side (base plate)
40 Slot
41 Slot
42 Threaded bore
43 Threaded bore
44 Device carrier
45 Central region
46 Cable holder
47 Spring clip
48 Right-side edge region
49 Cable holder
50 Spring clip
51 Left-side edge region

The invention claimed is:

1. A universal bracket for fastening at least one panel element and at least one additional installation in an aircraft, comprising:
 a base plate for fastening to a substructure of the aircraft, said base plate comprising at least one first slot, at least one first bore, a plurality of second bores, and at least one bore screen,
 wherein said first slot is configured for accommodating at least one first fastener for fastening said base plate to the substructure,
 a support plate connected to the base plate through at least one second fastener via said at least one first bore;
 at least one device carrier configured for fastening at least one emergency-related device in one of a plurality of positions, said at least one device carrier further configured to be fastened to said base plate by at least one third fastener through said bore screen, and
 a plurality of spring clips housed in the support plate for making a releasable and vibration-damping connection to the at least one panel element,
 wherein each of said plurality of spring clips is configured to pass through one of said plurality of second bores for fastening the panel element to the bracket;
 wherein the at least one bore screen has a plurality of bores arranged approximately equidistant from each other.

2. The universal bracket according to claim 1, wherein the support plate is connected displaceably to the base plate.

3. The universal bracket according to claim 1, further comprises a support frame, with at least one spring clip, arranged on the support plate for fastening at least one cover plate.

4. The universal bracket according to claim 1, wherein said base plate comprises a first and a second side,
 wherein the at least one panel element is configured to be fastened to said base plate facing the first side, and
 wherein the at least one device carrier is configured to be fastened to said base plate facing the second side.

5. The universal bracket according to claim 1, wherein the base plate comprises a fiber-reinforced plastic material.

6. The universal bracket according to claim 1, wherein the support plate comprises a metallic material.

7. The universal bracket according to claim 1, wherein at least two spring clips are received on the support plate so that they are displaceable.

8. The universal bracket according to claim 1, wherein the at least one device carrier comprises at least one of a spring clip and a cable holder.

9. The universal bracket according to claim 1, wherein the emergency-related device comprises at least one of an emergency lighting system and an emergency exit sign.

10. The universal bracket according to claim 1, wherein the base plate is generally triangular and has a base side, and
 wherein said at least one bore screen is substantially aligned with the base side.

11. The universal bracket according to claim 4, wherein the support frame is fastened to the first side of the support plate.

12. The universal bracket of claim 1, wherein each of the plurality of second bores is arranged at a distance of approximately 1.27 cm of one another.

\* \* \* \* \*